US008295886B2

(12) United States Patent
Kwon et al.

(10) Patent No.: US 8,295,886 B2
(45) Date of Patent: Oct. 23, 2012

(54) MOBILE TERMINAL AND APPARATUS FOR CONTROLLING ILLUMINATION OF BACKLIGHT THEREOF

(75) Inventors: Oh-Il Kwon, Seoul (KR); Jee-Young Cheon, Seoul (KR); Man-Soo Sin, Seoul (KR)

(73) Assignee: LG Electronics Inc., Seoul (KR)

( * ) Notice: Subject to any disclaimer, the term of this patent is extended or adjusted under 35 U.S.C. 154(b) by 1237 days.

(21) Appl. No.: 12/045,370

(22) Filed: Mar. 10, 2008

(65) Prior Publication Data

US 2009/0104941 A1 Apr. 23, 2009

(30) Foreign Application Priority Data

Oct. 23, 2007 (KR) ........................ 10-2007-0106864

(51) Int. Cl.
*H04B 1/38* (2006.01)

(52) U.S. Cl. ........................................ 455/566; 345/102

(58) Field of Classification Search .................. 455/566, 455/575.1, 550.1, 572; 345/102, 104, 63; 362/97.1, 97.2, 97.3
See application file for complete search history.

(56) References Cited

U.S. PATENT DOCUMENTS

| | | | | |
|---|---|---|---|---|
| 4,752,771 | A * | 6/1988 | Katogi et al. | 345/88 |
| 4,965,574 | A * | 10/1990 | Fukushima et al. | 340/995.27 |
| 5,831,693 | A | 11/1998 | McCartney, Jr. et al. | |
| 6,556,176 | B1 * | 4/2003 | Okuyama et al. | 345/76 |
| 6,812,649 | B2 * | 11/2004 | Kim | 315/149 |
| 7,180,485 | B2 * | 2/2007 | Kimura et al. | 345/76 |
| 2003/0214242 | A1 * | 11/2003 | Berg-johansen | 315/169.3 |
| 2005/0151716 | A1 * | 7/2005 | Lin | 345/102 |
| 2006/0151678 | A1 * | 7/2006 | Shibata | 250/205 |
| 2007/0171157 | A1 | 7/2007 | Choi et al. | |
| 2009/0040674 | A1 * | 2/2009 | Roberts et al. | 361/78 |

FOREIGN PATENT DOCUMENTS

| | | | |
|---|---|---|---|
| CN | 1680999 | A | 10/2005 |
| CN | 1804963 | A | 7/2006 |
| JP | 11-295692 | A | 10/1999 |
| JP | 2003-5717 | A | 1/2003 |
| JP | 2004-357193 | A | 12/2004 |
| JP | 2005-196165 | A | 7/2005 |
| JP | 2005-202105 | A | 7/2005 |
| JP | 2006-194612 | A | 7/2006 |
| JP | 2006-285064 | A | 10/2006 |
| WO | WO-2007/069107 | | 6/2007 |

* cited by examiner

*Primary Examiner* — Nay A Maung
*Assistant Examiner* — Angelica Perez
(74) *Attorney, Agent, or Firm* — Birch, Stewart, Kolasch & Birch, LLP

(57) ABSTRACT

An apparatus, method and computer program product for actively controlling the luminance (brightness) of illumination of a backlight of a mobile terminal according to the surrounding environment and a mobile terminal implementing such apparatus are disclosed. The mobile terminal includes: an illuminance sensor that detects ambient illuminance; a backlight controller that controls a brightness of backlight illumination by regulating the power outputted to the backlight according to a change in the ambient illuminance detected by the illuminance sensor; and a controller that monitors an operation state of the backlight controller or changes a set value of a particular register or component by cooperating with the backlight controller.

19 Claims, 7 Drawing Sheets

MOBILE TERMINAL AND APPARATUS FOR CONTROLLING ILLUMINATION OF BACKLIGHT THEREOF

CROSS REFERENCE TO RELATED APPLICATIONS

The present invention relates to subject matter contained in priority Korean Application No. 10-2007-0106864, filed on Oct. 23, 2007, which is herein expressly incorporated by reference in its entirety.

BACKGROUND

1. Field of Invention

An apparatus, method and computer program product for actively controlling the illumination of a mobile terminal backlight according to the surrounding environment and a mobile terminal that implements such an apparatus and method are provided.

2. Discussion of the Background

A mobile terminal is a device that can be carried around and have one or more functions such as voice and video call communication, inputting and outputting information, storing data, and the like.

As such the functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions, numerous attempts are being made and implemented in terms of hardware or software in such multimedia player or devices. For example, a user interface environment is provided to allow users to easily and conveniently search or select one or more functions.

Also, as users consider their mobile terminal to be a personal portable device that may express their personality, various designs for the mobile terminals are required. For example, folder type, slide type, bar type and rotation type designs are employed for mobile terminals.

However, the related art mobile terminal simply controls the brightness of a backlight used in a display unit, without actively controlling the brightness according to ambient illumination (i.e., the brightness of the surrounding environment).

Namely, the brightness of backlight illumination is controlled by about two steps according to an operation state of the mobile terminal, not according to the surrounding environment. For example, when the folder part of the related art mobile terminal is opened, the backlight is unconditionally controlled to operated at its maximum brightness regardless of ambient illumination, and when the mobile terminal returns to the standby state after the lapse of time, the backlight is unconditionally controlled to operate at its minimum brightness.

Thus, in the related art mobile terminal, because the illumination of the backlight is controlled without considering the ambient illumination conditions, when the backlight is unconditionally controlled to operate at its maximum brightness, power consumption increases, and when the backlight is unconditionally controlled to operate at its minimum brightness, visibility of the display unit is degraded.

SUMMARY OF THE INVENTION

The present inventors recognized certain drawbacks of the related art, as explained above. Upon such recognition, the following concepts and features have been conceived.

A mobile terminal, method and computer program product for actively controlling the illumination of its backlight according to an ambient illuminance and an apparatus, method and computer program product for controlling the illumination of the backlight of the mobile terminal are provided herein.

A mobile terminal, method and computer program product for actively controlling the illumination of its backlight according to an ambient illuminance to reduce power consumption and improve visibility of its display unit, and an apparatus, method and computer program product for controlling illumination of a backlight of the mobile terminal are also provided herein.

Thus, a mobile terminal related to one embodiment of the present invention includes: an illuminance sensor that detects an ambient illuminance; a backlight controller that controls brightness of illumination by regulating the power outputted to a backlight according to a change in the ambient illuminance detected by the illuminance sensor; and a controller that monitors an operation state of the backlight controller or changes a set value of a particular register by cooperating with the backlight controller.

Also, an apparatus for controlling illumination of a backlight related to another embodiment of the present invention includes: a current regulating unit that controls current of driving power to be outputted to a backlight according to a change in an ambient illuminance; a limiter that controls such that the voltage of the power outputted from the current regulating unit does not exceed a pre-set level; and a delay unit that allows the brightness of the backlight illumination to change in a gradual manner during a particular delay time when an ambient illuminance changes rapidly.

In one embodiment of the present invention, because brightness of illumination of a backlight of the mobile terminal is actively controlled according to illumination of the surrounding environment, current consumption of the mobile terminal can be reduced and visibility of a display unit can be improved.

In one embodiment of the present invention, a minimum illuminance values a maximum illuminance value, and the change speed of brightness to be used for brightness of illumination of the backlight of the mobile terminal can be set by software.

In the present invention, an illuminance value and a brightness changing rate to be used for controlling brightness of illumination of the backlight of the mobile terminal can be changed even after the mobile terminal is manufactured.

DETAILED DESCRIPTION

Figure 1:
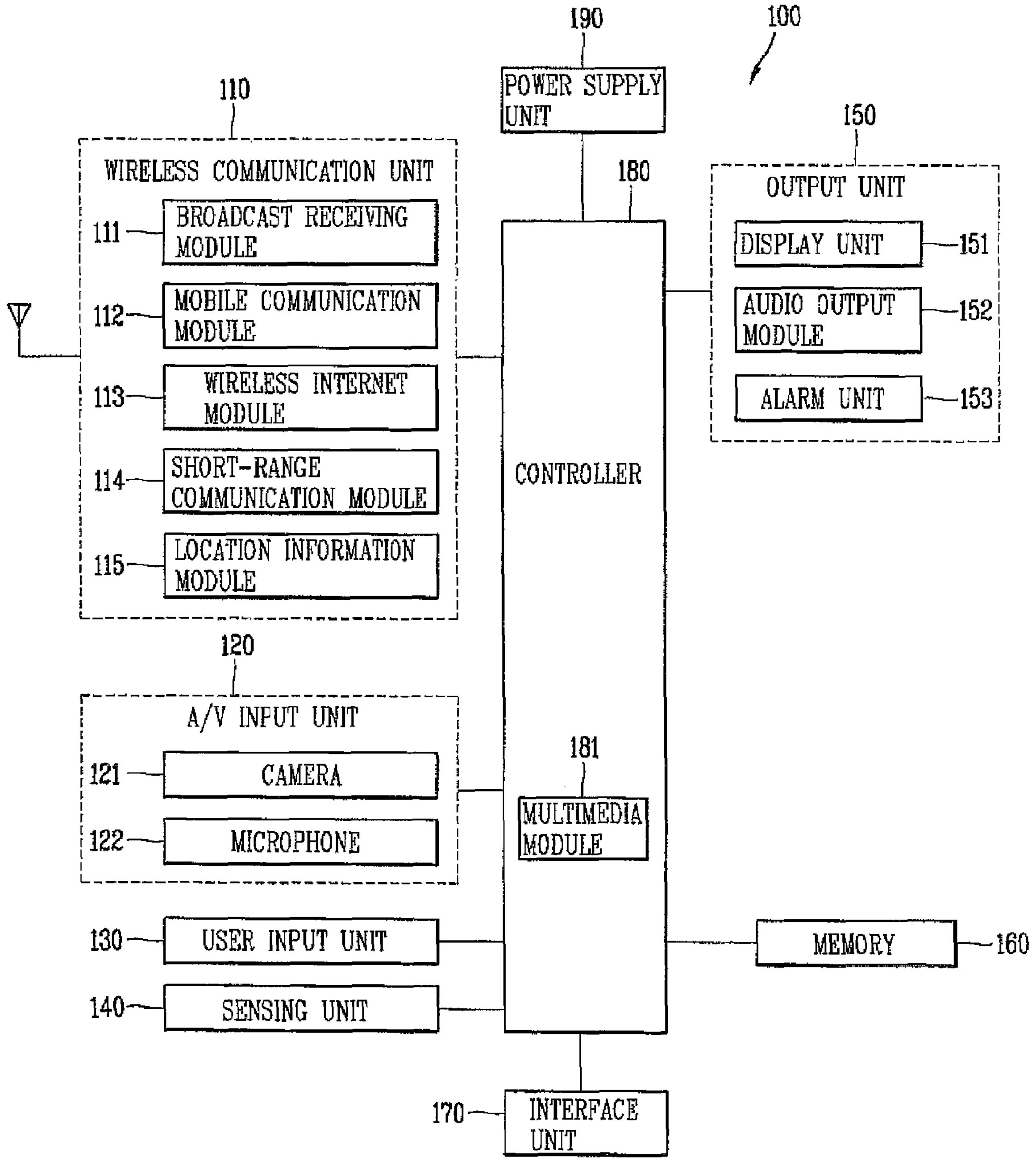
FIG. 1 is a schematic block diagram showing the configuration of a mobile terminal related to one embodiment of the present invention.

Various embodiments according to the present invention will now be described in detail with reference to the accompanying drawings. In describing the present invention, if a detailed explanation for a related known function or construction is considered to unnecessarily divert the gist of the present invention, such explanation has been omitted but would be understood by those skilled in the art. In describing the present invention with reference to drawings, the same reference numerals are given to the elements that perform the same functions.

The mobile terminal described in the present invention may include a mobile phone, a smart phone, a notebook computer a navigation, a digital broadcasting terminal, a PDA (Personal Digital Assistant), a PMP (Portable Multimedia Player), and the like.

FIG. 1 is a schematic block diagram showing the configuration of a mobile terminal related to one embodiment of the present invention.

The mobile terminal 100 may comprise elements, such as a wireless communication unit 110, an audio/video (A/V) input unit 120, a user input unit 130, a sensing unit 140, an output unit 150, a memory 160, an interface unit 170, a controller 180, and a power supply unit 190, and the like. FIG. 1 illustrates the mobile terminal having various elements. However, it is understood that the illustrated elements are not all essential elements. That is, the mobile terminal may be implemented with a larger number of elements or a smaller number of elements, as required.

The wireless communication unit 110 may include at least one element which permits wireless communication between the mobile terminal 100 and a wireless communication system or between the mobile terminal 100 and a network in which the mobile terminal 100 is located. For example, the wireless communication unit 110 may comprise a broadcast receiving module 111, a mobile communication module 112, a wireless internet module 113, a short-range communication module 114 and a location information module 115.

The broadcast receiving module 111 receives a broadcast signal and/or broadcast associated information from an external broadcast management server via a broadcast channel. The broadcast channel may include a satellite channel and a terrestrial channel. The broadcast management server may refer to a server that generates and transmits a broadcast signal and/or broadcast associated information or a server that receives a pre-generated broadcast signal and/or broadcast associated information and sends them to the mobile terminal. The broadcast associated information may include information associated with a broadcast channel, a broadcast program, or a broadcast service provider, etc. The broadcast signal may include not only a TV broadcast signal, a radio broadcast signal, and a data broadcast signal, but also a broadcast signal obtained by combining the data broadcast signal to the TV broadcast signal or the radio broadcast signal.

The broadcast associated information may be provided via a mobile communication network, and in this case, it may be received by the mobile communication module 112.

The broadcast associated information may exist in various formats. For instance, the broadcast associated information may exist in such formats as Electronic Program Guide (EPG) of Digital Multimedia Broadcasting (DMB), Electronic Service Guide (ESG) of Digital Video Broadcast-Handheld (DVB-H), and the like.

The broadcast receiving module 111 receives broadcast signals by using various types of broadcast systems. In particular, the broadcast receiving module 111 may receive digital broadcast signals by using digital broadcast systems such as Digital Multimedia Broadcasting-terrestrial (DMB-T), Digital Multimedia Broadcasting-satellite (DMB-S), Media Forward Link Only (MediaFLO™), Digital Video Broadcast-handheld (DVB-H), Integrated Services Digital Broadcast-Terrestrial (ISDB-T), and the like. The broadcast receiving module 111 may be configured to be suitable for certain broadcast systems that provide broadcast signals, as well as for the digital broadcasting systems.

Broadcast signals and/or broadcast associated information received via the broadcast receiving module 111 may be stored in the memory 160.

The mobile communication module 112 transmits/receives radio signals to/from at least one of a base station, an external mobile terminal, a server in a mobile communication network, and the like. Here, the radio signals may include a voice call signal, a video call signal, or various formats of data according to transmission/reception of text/multimedia messages.

The wireless Internet (network) module 113 supports wireless network access. This module may be internally or externally coupled to the mobile terminal.

The short-range communication module 114 refers to a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 may check or obtain a location information of the mobile terminal. For example, the location information module 115 may include a Global Positioning System (GPS) module. The GPS module may receive location information from several artificial satellites. Here, the location information may include coordinates information indicated as the latitude and the longitude. For example, the GPS module may measure each precise time and distance from three or more satellites and accurately calculate a current location according to trigonometry based on the three different distances. A method in which the distance and time information are obtained from three satellites and an error is corrected by a single satellite may be also used. In particular, the GPS module may obtain a precise time together with three-dimensional speed information as well as the latitude, the longitude and the altitude from the location information received from the satellite.

The A/V input unit 120 is configured to input an audio or video signal. The A/V input unit 120 may include a camera 121 and a microphone 122. The camera 121 processes image data of still pictures or videos obtained by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and process it into audio data. The processed audio (voice) data may be converted for output into a format transmittable to a mobile communication base station via the mobile communication module 112 in case of the phone call mode. The microphone 122 may include various types of noise canceling (or suppression) algorithms to cancel (or suppress) noise generated in the course of receiving and transmitting audio signals.

The user input unit 130 may generate key input data inputted by a user to control various operations of the mobile terminal. The user input unit 130 may include a keypad, a dome switch, a touch pad (e.g., a touch sensitive member that detects changes in resistance, pressure, capacitance, etc.), a jog wheel, a jog switch, and the like. In particular, when the touch pad is overlaid on the display unit 151 in a layered manner, it may be called a touch screen.

The sensing unit 140 detects a current status (or state) of the mobile terminal 100 such as an open/close state of the mobile terminal 100, a location of the mobile terminal 100, presence or absence of user contact with the mobile terminal, the orientation of the mobile terminal, acceleration/deceleration of the mobile terminal 100, etc., and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile terminal 100. For example, the external devices may include wired/wireless headsets, external power charger ports, wired/wireless data ports, memory card ports, a port for connecting a device having an identification module, audio input/output (I/O) ports, video I/O ports, earphone ports, and the like.

Here, the identification module may refer to a chip storing various information to authenticate the authority to use the mobile terminal 100 and include a user identity module (UIM), a subscriber identity module (SIM), a universal subscriber identity module (USIM), etc. The device having the identification module (referred to as 'identifying device', hereinafter) may be fabricated as a smart card. Thus, the identifying device may be connected with the mobile terminal 100. The interface unit 170 may be used to receive inputs (e.g., data, information, power, etc.) from an external device and transfer the received inputs to one or more elements within the mobile terminal, or may be used to transfer data from the mobile terminal to an external device.

The output unit 150 is configured to provide outputs in a visual, audible, and/or tactile manner (e.g., audio signal, video signal, alarm signal, etc.). The output unit 150 may include the display unit 151, an audio output module 152, an alarm unit 153, and the like.

The display unit 151 may output information processed in the mobile terminal 100. For example, when the mobile terminal 100 is in the phone call mode, the display unit 151 may display a User Interface (UI) or a Graphic User Interface (GUI) associated with a call or other communication. When the mobile terminal 100 is in the video call mode or the image capturing mode, the display unit 151 may display a captured and/or received image, a UI, a GUI, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED), a flexible display, a three-dimensional (3D) display, or the like. The mobile terminal 100 may include two or more display units (or other display means) according to its embodiment. For example, the mobile terminal may include an external display screen and an internal display screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzers a sound generating device, or the like.

The alarm unit 153 may provide outputs to inform about an occurrence of an event of the mobile terminal 100. Typical events occurring at the mobile terminal may include a call signal reception, a message reception, a key signal input, etc. In addition to audio or video outputs, the alarm unit 153 may provide outputs in a different manner to inform about an occurrence of an event. For example, the alarm unit 153 may provide outputs in the form of vibrations (or other tactile means). When a call signal, a message, or some other incoming communication is received, the alarm unit 153 may provide tactile outputs (i.e., vibrations) to inform the user. Or when a key is pressed (or when a key signal is generated), the alarm unit 153 may output vibrations to provide tactile feedback with respect to the pressed key. By providing tactile outputs, the user can recognize the occurrence of various events. Outputs informing about the occurrence of an event may be also provided via the display unit 151 or the audio output module 152. In other words, different types of outputs (audible, visual, tactile, etc.) may be set such that different types of events can be more easily recognized by the type of output being provided. For example, an incoming call may be indicated in an audible manner, an incoming text (or multimedia) message may be indicated in a visual manner, and keypad user inputs may be indicated in a tactile manner.

The memory 160 may store software programs or the like used for the processing and controlling performed by the controller 180, or may temporarily store inputted/outputted data (e.g., a phonebook, messages, still images, video, etc.).

The memory 160 may include at least one type of storage medium including a flash memory type, a hard disk type, a multimedia card type, a card-type memory (e.g., SD or DX memory, etc), a Random Access Memory (RAM), an SRAM (Static RAM), a Read-Only Memory (ROM), an EEPROM (Electrically Erasable Programmable Read-Only Memory), a PROM (Programmable Read-Only Memory), a magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separated from the controller 180.

The power supply unit 190 receives external or internal power and supplies power required for the operations of the respective elements under the control of the controller 180.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may be implemented by the controller 180.

For a software implementation, the embodiments such as procedures and functions described herein may be implemented with separate software modules, each of which perform one or more of the functions and operations described herein. The software codes can be implemented with a software application written in any suitable programming language. Also, the software codes may be stored in a memory (e.g., the memory 160) and executed by a controller or processor (e.g., the controller 180).

So far, the internal elements of the mobile terminal have been described from the perspective of their functions. Hereinafter, external elements of the mobile terminal will be described from the perspective of their functions with reference to FIGS. 2 and 3.

The mobile terminal may be implemented in a variety of different configurations, including a folder-type, a bar-type, a swing-type, a slide-type, or the like. For the sake of brevity, the slide-type mobile terminal will be used as an example in the following description. However, the concepts and features described herein should not be limited to the slide-type mobile terminal, but can be applicable to any type of mobile terminal or other electronic device including the ones as mentioned above.

Figure 2:
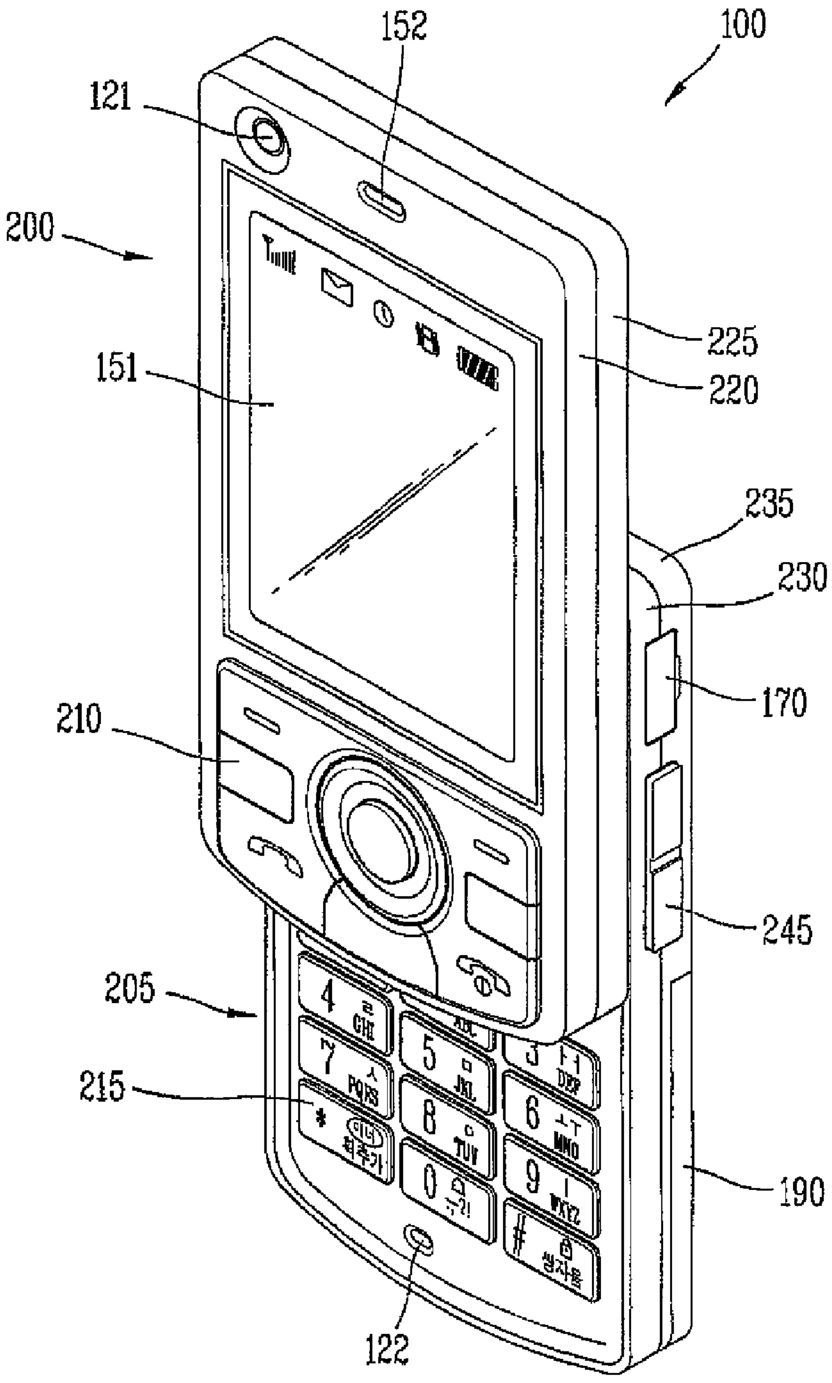
FIG. 2 is a front perspective view of a mobile terminal related to the present invention.

FIG. 2 is a front view of the mobile terminal according to an exemplary embodiment.

The mobile terminal may comprise a first body 200, and a second body 205 configured to be slidably moved in at least one direction with respect to the first body 200.

A state in which the first body 200 is disposed to overlap with the second body 205 may be called a closed configuration, and as shown in FIG. 2, a state in which the first body 200 exposes at least a portion of the second body 205 may be called an open configuration.

The mobile terminal may usually operate in a standby mode in the closed configuration, but this mode can be released by a user manipulation. In the open configuration, the mobile terminal may mainly function in a call mode or the like, but may be changed to the standby mode according to user manipulation or after the lapse of a certain time.

At least one case (housing, casing, cover, etc.) constituting the external appearance of the first body 200 comprises a first front case 220 and a first rear case 225. Various electronic components may be installed inside the first front case 220 and the first rear case 225. One or more intermediate cases may be additionally disposed between the first front case 220 and the first rear case 225.

The case can be formed by injection-molding a synthetic resin, or made of a metallic material such as stainless steel (STS) or titanium (Ti), or some other appropriate materials.

The display unit 151, the audio output module 152, the camera module 121 or a first user input unit 210 may be located on the first body 200, specifically, on the first front case 220.

The display unit 151 may include LCD, OLED, and the like, that visually displays information.

A touch pad may be overlaid in a layered manner on the display unit 151 to allow the display unit 151 to function as a touch screen to input information.

The audio output module 152 may be implemented as a speaker.

The camera 121 may be implemented to be suitable for a user to capture still images or video of a user and so on.

Like the first body 200, a case constituting the external appearance of the second body 205 may be formed by a second front case 230 and a second rear case 235.

A second user input unit 215 may be disposed at the second body 205, specifically, on a front face of the second front case 230.

A third user input unit 245, a microphone 122 and an interface unit 170 may be disposed at either the second front case 230 or the second rear case 235.

The first to third user input units 210, 215 and 245 may be called a manipulating portion 130, and various methods can be employed for the manipulation portion so long as it can be operated by the user in a tactile manner.

For example, the user input unit can be implemented as a dome switch or touch pad that can receive user commands or information according to a pressing, pushing or touching, or implemented in the form of a dial, a wheel, a jog element, a joystick, or the like to allow user manipulation thereof.

In terms of its functions, the first user input unit 210 is used for inputting commands such as start, end, scroll or the like, and the second user input unit 215 is used for inputting numbers, characters, symbols, or the like.

The third user input unit 245 can be operated to support a so-called hot key function (e.g., speed dialing, dedicated key inputs, etc.) for activating a special function of the mobile terminal.

The microphone 122 may be implemented to be suitable for receiving the user's voice and other various sounds.

The interface unit 170 may be used as a link (passage or path) through which the terminal can exchange data or the like with an external device. For example, the interface unit 170 may be implemented as one of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the external device, or the like.

The interface unit 170 may be a card socket for accommodating an external card, such as a Subscriber Identity Module (SIM), a User Identity Module (UIM), a memory card for storing information, or the like.

The power supply unit 190 for supplying power to the terminal is located at the side portion of the second rear case 235.

The power supply unit 190 may be, for example, a rechargeable battery that can be detached.

Figure 3:
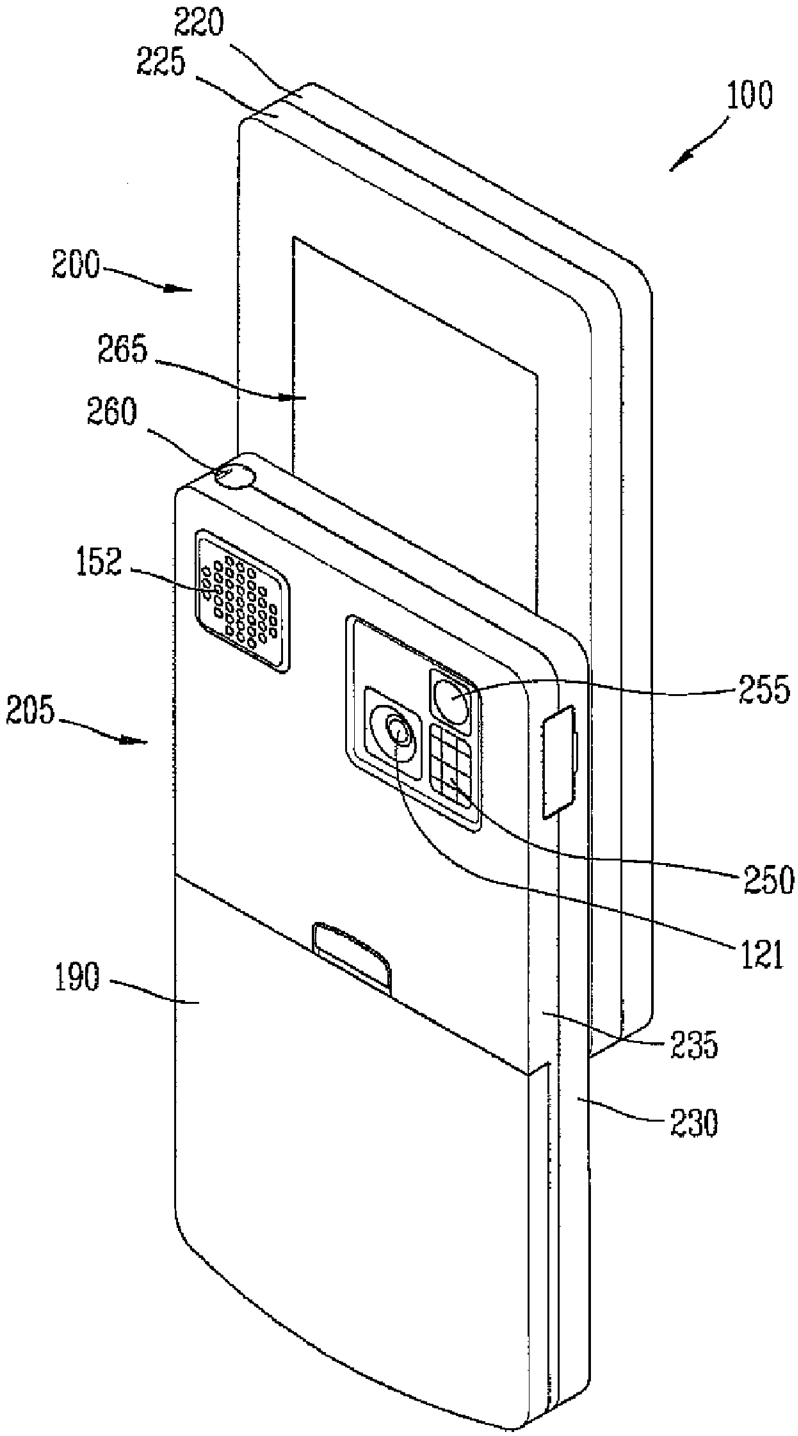
FIG. 3 is a rear perspective view of the mobile terminal in FIG. 2.

FIG. 3 is a rear view of the mobile terminal according to an exemplary embodiment.

With reference to FIG. 3, the camera 121 may be additionally disposed on a rear surface of the second rear case 235 of the second body 205. The second camera 121 may have an image capture direction which is substantially the opposite to that of the camera 121 of the first body 200, and may support a different number of pixels as that of the first camera 121.

For example, the camera 121 of the first body 200 may be used for low resolution (i.e., supporting a relatively small number of pixels) to quickly capture an image (or video) of the user's face and immediately transmit the same to the other party during video conferencing or the like. Meanwhile, the camera 121 of the second body 200 may be used for high resolution (i.e., supporting a relatively large number of pixels) in order to capture more detailed (higher quality) images (or video) which typically do not need to be transmitted immediately.

A flash 250 and a mirror 255 may be additionally disposed adjacent to the camera 121 of the second body 205. When an image of the subject is captured with the camera 121 of the second body 205, the flash 250 illuminates the subject. The mirror 255 allows the user to see himself when he wants to capture his own image (self-image capturing) by using the camera 121 of the second body 205.

The second rear case 235 may further include the audio output module 152.

The audio output module 152 of the second body may implement a stereophonic sound function in conjunction with the audio output module 152 of the first body 200, and may be also used for sending and receiving calls in a speaker phone mode.

A broadcast signal receiving antenna 260 may be disposed at one side or region of the second rear case 235, in addition to an antenna that supports mobile communications. The antenna 260 can be configured to be retractable from the second body 235.

One part of a slide module 265 that slidably combines the first body 200 and the second body 205 may be disposed on the first rear case 225 of the first body 200.

The other part of the slide module 265 may be disposed on the second front case 230 of the second body 205, which may not be exposed as shown in FIG. 3.

In the above description, the camera 121 and so on is disposed on the second body 205, but such configuration is not meant to be limited.

For example, one or more of the elements (e.g., 260, 121, 250 and 152, etc.), which are disposed on the second rear case 235 in the above description, may be mounted on the first body 200, mainly, on the first rear case 225. In this case, those elements disposed on the first rear case 225 can be protected (or covered) by the second body 205 in the closed configuration. In addition, even if the camera 121 of the second body 205 is not provided, the camera 121 of the first body 200 may be configured to rotate (or otherwise be moved) to thus allow image capturing in various directions.

The mobile terminal 100 as shown in FIGS. 1 to 3 may be configured to operate within a communication system which transmits data via frames or packets, including both wired/wireless communication systems and satellite-based communication systems.

The communication systems in which the mobile terminal related to the present invention is operable will now be described with reference to FIG. 4.

Such communication systems may utilize different air interfaces and/or physical layers. For example, such air interfaces utilized by the communication systems may include frequency division multiple access (FDMA), time division multiple access (TDMA), code division multiple access (CDMA), and universal mobile telecommunications system (UMTS) (In particular, the long term evolution (LTE) of the UMTS), the global system for mobile communications (GSM), and the like. By way of non-limiting example only, further description will relate to the CDMA communication system, but such teachings apply equally to other system types.

Figure 4:
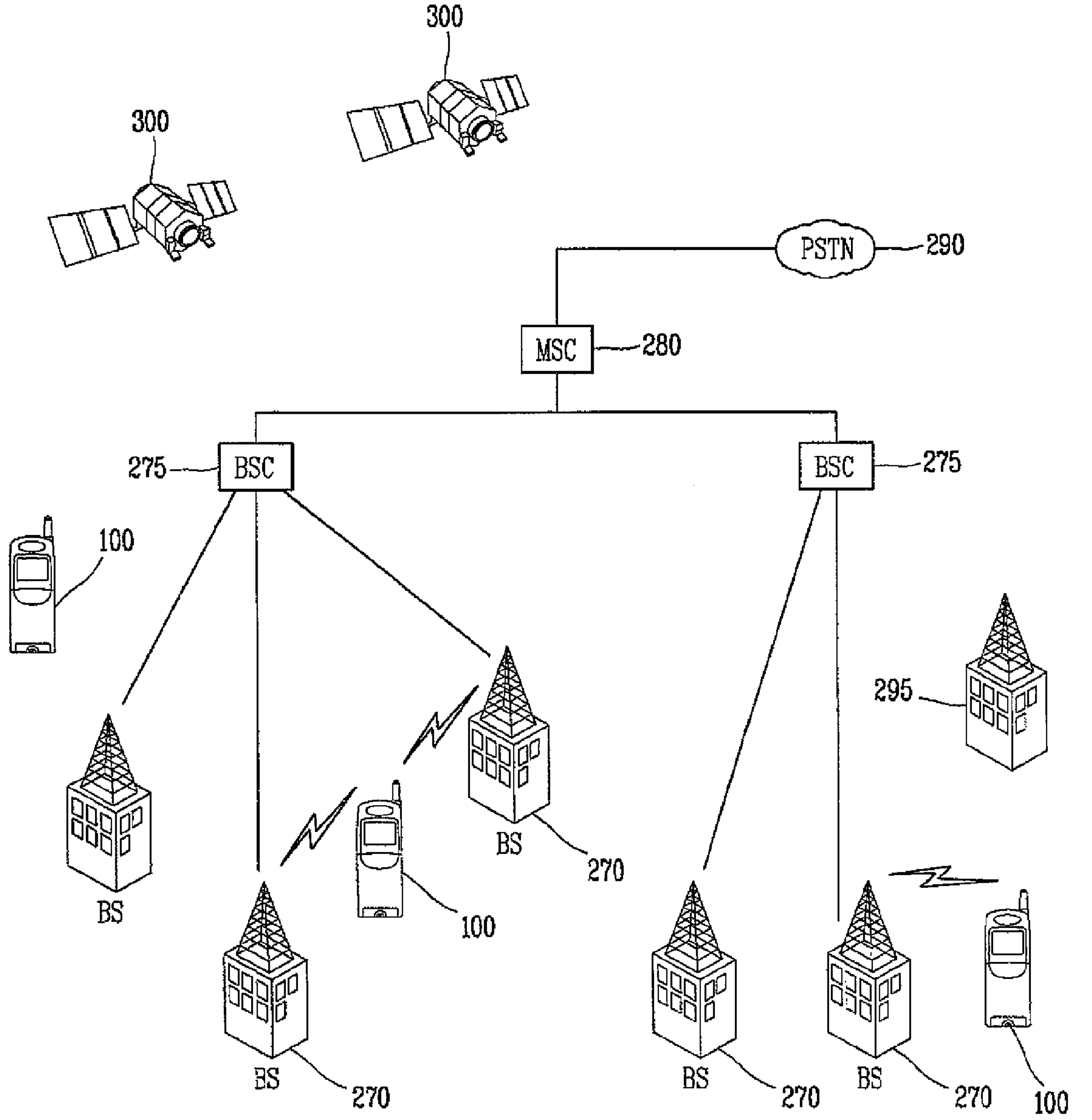
FIG. 4 is a view illustrating a communication system in which a mobile terminal related to the present invention can operate.

Referring to FIG. 4, the CDMA wireless communication system may include a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured according to any of several known interfaces including, for example, E1/T1, ATM, IP, PPP, Frame Relay, HDSL, ADSL, or xDSL. It is to be understood that the system may include multiple BSCs 275.

Each base station 270 may include at least one sector, each sector having an omnidirectional antenna or an antenna pointing in a particular direction radially from the base station 270. Alternatively, each sector may include two or more antennas for diversity reception. Each base station 270 may be configured to support a plurality of frequency assignments, with each frequency assignment having a particular spectrum (e.g., 1.25 MHz, 5 MHz, etc.).

The intersection of a sector and frequency assignment may be referred to as a CDMA channel. The base stations 270 may also be referred to as base station transceiver subsystems (BTSs). In this case, the term "base station" may be used to refer collectively to the BSC 275 and at least one base station 270. The base stations may also denote "cell sites." Alternatively, individual sectors of a particular base station 270 may be referred to as cell sites.

As shown in FIG. 4, a broadcasting transmitter (BT) 295 transmits broadcast signals to the mobile terminals 100 operating within the system. The broadcast receiving module 111 as shown in FIG. 1 is provided within the terminal 100 to receive the broadcast signals transmitted by the BT 295.

FIG. 4 further depicts GPS satellites 300. Such satellites 300 facilitate locating the position of at least one of the mobile terminals 100. Two satellites are shown in FIG. 4, but it is understood that useful positioning information (or location information) may be obtained with two or less or two or more satellites. The GPS module 115 as shown in FIG. 1, is typically configured to cooperate with the satellites 300 to obtain desired location information. Here, it is to be appreciated that, as well as the GPS technique, any other types of location tracking technologies may be used to locate the position. In addition, at least one of the GPS satellites 300 may be selectively or additionally used to handle satellite DMB transmissions.

During typical operation of the wireless communication system, the base stations 270 receive sets of reverse-link signals from various mobile terminals 100. At this time, the mobile terminals 100 are engaged in a call connection, are transmitting or receiving messages, or are performing any other communication operations. Each reverse-link signal received by a particular base station 270 is processed within the corresponding base station 270. The resulting data is forwarded to an associated BSC 275. The BSC 275 provides call resource allocation and mobility management functionality including the orchestration of soft handoffs between base stations 270. In addition, the BSCs 275 transmits the received data to the MSC 280, which provides additional transmission services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Figure 5:
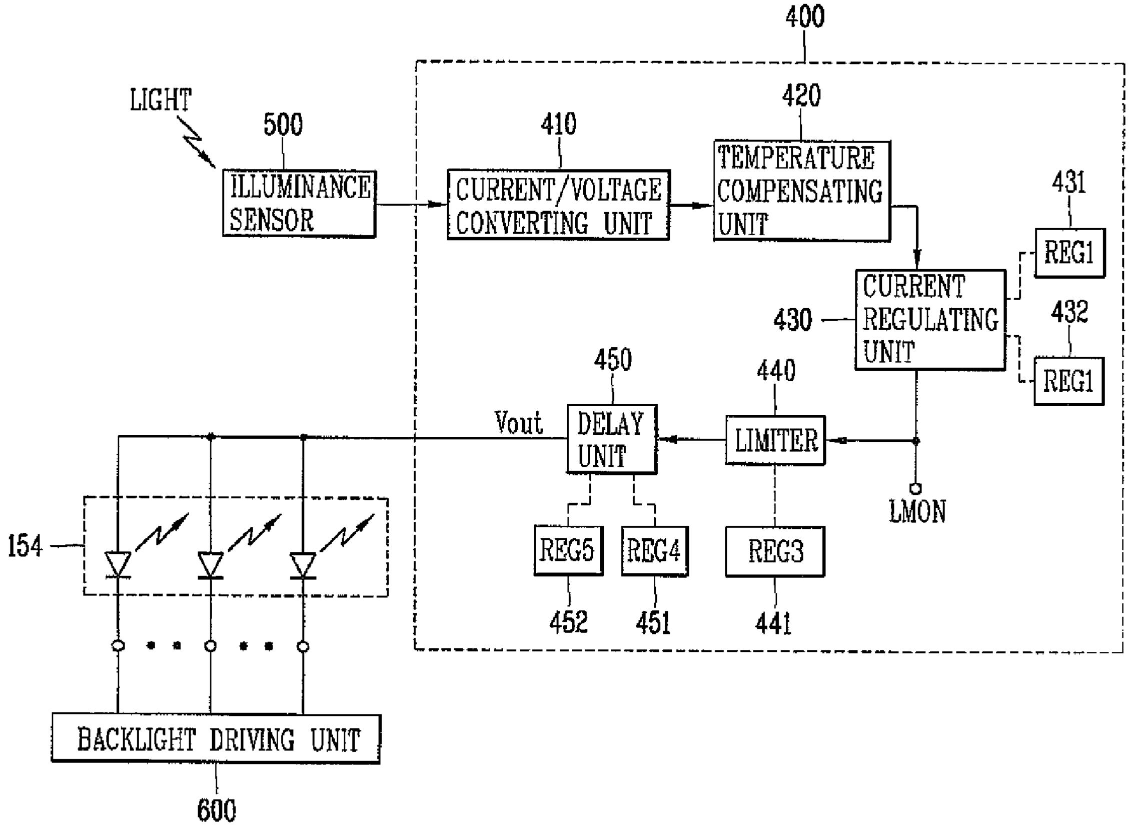
FIG. 5 is a schematic block diagram showing the configuration of an apparatus for controlling illumination of a backlight related to the present invention.

FIG. 5 is a schematic block diagram showing the configuration of an apparatus for controlling illumination of a backlight related to the present invention;

The apparatus for controlling illumination of a backlight according to the present invention may be configured as a single chip or may be configured to be included in a driving circuit that applies current to the backlight or switches it. For example, the backlight illumination controlling apparatus may be configured to be included in a charge pump circuit to control the backlight of an LCD display unit or may be configured as a separate luminance control chip. As a matter of course, besides the charge pump circuit, the backlight illumination controlling apparatus may be configured to be included in a chip or a circuit associated with controlling the display unit or illumination of the backlight.

With reference to FIG. 5, at least one illuminance sensor 500 detects an ambient illuminance (i.e., the brightness of the surrounding environment) and outputs current corresponding to the detected illuminance. The illuminance sensor 500 may include a photodiode or a photo-transistor or some other type of appropriate light sensor, such illuminance sensor 500 may be located (implemented) at various portions of the mobile terminal (such as near the display screen) depending upon the particular design of the mobile terminal itself.

A current/voltage converting unit 410 may converts a current value outputted from the illuminance sensor 500 into an appropriate voltage and output the same.

A temperature compensating unit 420 may correct the voltage value outputted from the current/voltage converting unit 410. Because the output voltage varies according to an increase in temperature of the current/voltage converting unit 410, the output voltage of the current/voltage converting unit 410 should be corrected by the temperature compensating unit 420.

For example, when the current/voltage converting unit 410 is configured by using a diode, the output voltage varies by about −2 mV/° C. due to the characteristics that an increase in temperature causes a reduction in resistance, which results in a lowered output voltage.

Accordingly, considering the temperature characteristics of the current/voltage converting unit 410, the temperature compensating unit 420 serves to perform a correction procedure to maintain a certain (uniform) voltage proportional to the input voltage.

Because the voltage value output from the current/voltage converting unit 410 is small, a current regulating unit 430 may amplify the voltage value to have a particular gain to precisely control current to be outputted to the backlight.

The current regulating unit 430 may set a minimum illuminance value to be used for maintaining the brightness of illumination of the backlight at a minimum level and a maximum illuminance value to be used for maintaining the brightness of illumination of the backlight at a maximum level by controlling the current of driving power to be outputted to the backlight according to a change in illuminance. Alternatively, the current regulating unit 430 may control the current to be outputted to the backlight according to a proportional expression from which a current amount according to illuminance can be recognized.

The current regulating unit 430 may include a first register (REG1) 431 or other component that sets a maximum illuminance value to be used for maintaining maximum brightness by allowing a maximum current to flow to the backlight and a second register (REG2) 432 or other component that sets a minimum illuminance value to be used for maintaining minimum brightness by allowing a minimum current to flow to the backlight. The maximum illuminance value set in the first register 431 is a relative value with respect to the minimum illuminance value set in the second register 432. The illuminance values may be set with voltage levels outputted through the temperature compensating unit 420.

Namely, provided the maximum illuminance value is set as 100 lux, if the minimum illuminance value is 10 lux, brightness of illumination of the backlight is minimized at 10 lux and maximized at 110 lux. Likewise, when the minimum illuminance value is 20 lux, brightness of illumination of the backlight is minimized at 20 lux and maximized at 120 lux.

By adjusting the values set in the first and second registers 431 and 432, a section in which brightness of illumination of the backlight varies according to ambient illuminance may be set. Namely, when the ambient illuminance is lower than the value set in the second register 432, the backlight is driven with a minimum current, while when the ambient illuminance is higher than an illuminance value obtained by adding the illuminance value set in the first register 431 to the illuminance set in the second register 432, the backlight is driven with a maximum current. For example, when the minimum illuminance value is set as 10 lux and the maximum illuminance value is set as 100 lux, the backlight is driven with the minimum current at 10 lux and driven with the maximum current at 110 lux obtained by adding 10 lux and 100 lux.

Figure 6:
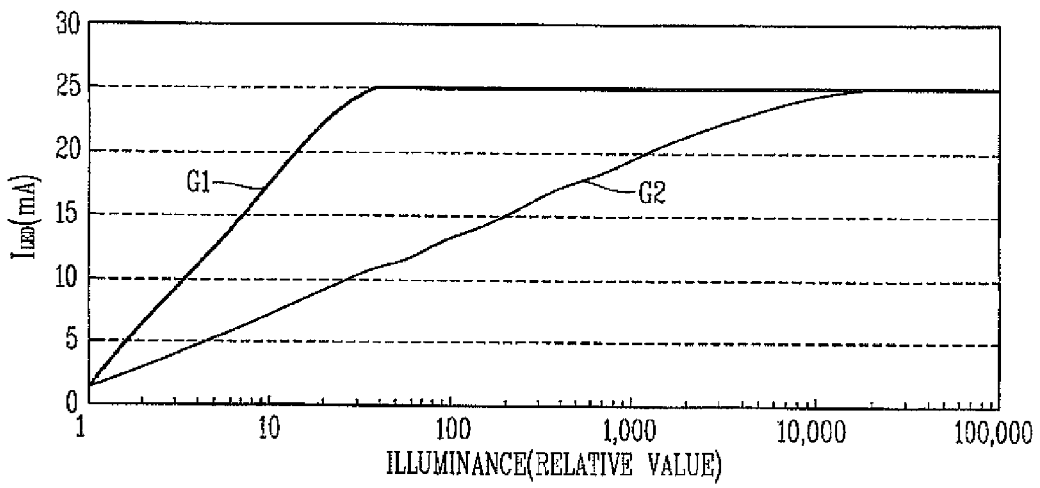
FIG. 6 is a graph showing a method for controlling current to maintain maximum brightness of illumination of the backlight according to a maximum illuminance value set in a first register in FIG. 5.

The difference between the first and second registers 431 and 432 will now be described with reference to graphs as shown in FIGS. 5 and 6.

FIG. 6 is a graph showing a method for controlling current to maintain maximum brightness of illumination of the backlight according to the maximum illuminance value set in the first register 431. As shown, as the maximum illuminance value is adjusted in the state that the minimum illuminance value is fixed, brightness, ranging from the minimum level to the maximum level, of illumination of the backlight can be precisely controlled according to illuminance.

With reference to FIG. 6, there is shown a difference between the case (G1) in which the maximum illuminance value set in the first register 431 is set as 70 lux and the case (G2) in which the maximum illuminance value set in the first register 431 is 10,000 lux, provided that the minimum illuminance value set in the second register 432 is fixed as 1 lux. Namely, with the maximum illuminance value set as 10,000 lux, when a current illuminance is 70 lux, current flowing across the backlight is about 10 mA, and with the maximum illuminance set as 70 lux, when the current illuminance is 70 lux, current flowing across the backlight is 25 mA, equivalent to the maximum current.

Figure 7:
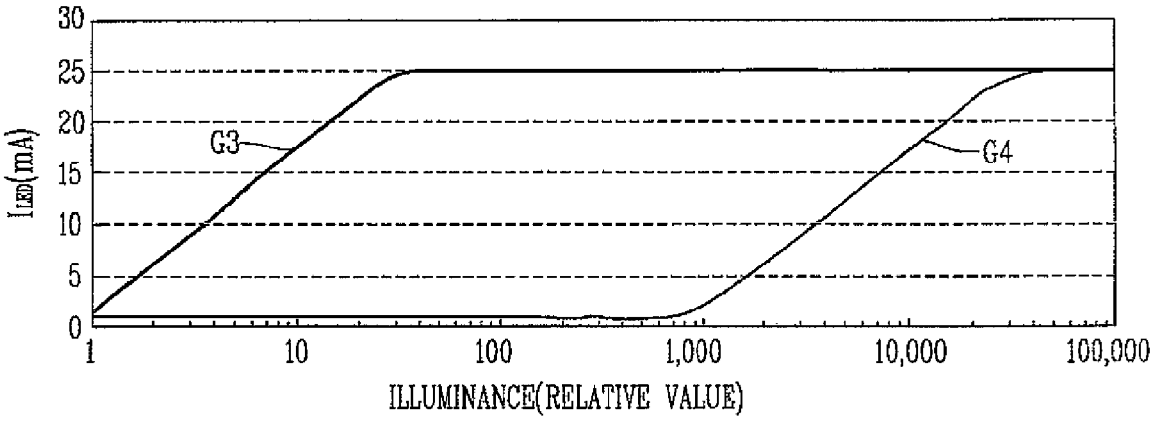
FIG. 7 is a graph showing a method for controlling current to maintain minimum brightness of illumination of the backlight according to a maximum illuminance value set in a second register in FIG. 5.

FIG. 7 is a graph showing a method for controlling current to maintain minimum brightness of illumination of the backlight according to an illuminance value set in the second register 432. By adjusting the minimum illuminance value in a state that the maximum illuminance value is fixed, illuminance for maintaining the minimum brightness of illumination of the backlight can be simply controlled.

With reference to FIG. 7, there is shown a difference between the case (G3) in which the minimum illuminance value set in the second register 432 is set as 1 lux and the case (G4) in which the minimum illuminance value set in the second register 432 is 1,000 lux, provided that the maximum illuminance value set in the first register 431 is fixed as 70 lux. Namely, with the minimum illuminance value set as 1 lux, when a current illuminance is 1 lux, a minimum current flows across the backlight, and with the minimum illuminance set as 1,000 lux, when the current illuminance is 1,000 lux, a minimum current flows across the backlight.

For reference, with the maximum illuminance value fixed as 70 lux, if 1 lux is set as the minimum illuminance value and a current illuminance is 70 lux, brightness of illumination of the backlight is maximized. With the minimum illuminance value set as 1,000 lux, if 1,000 lux is set as the minimum illuminance value and a current illuminance is 1,070 lux, brightness of illumination of the backlight is maximized.

Figure 8:
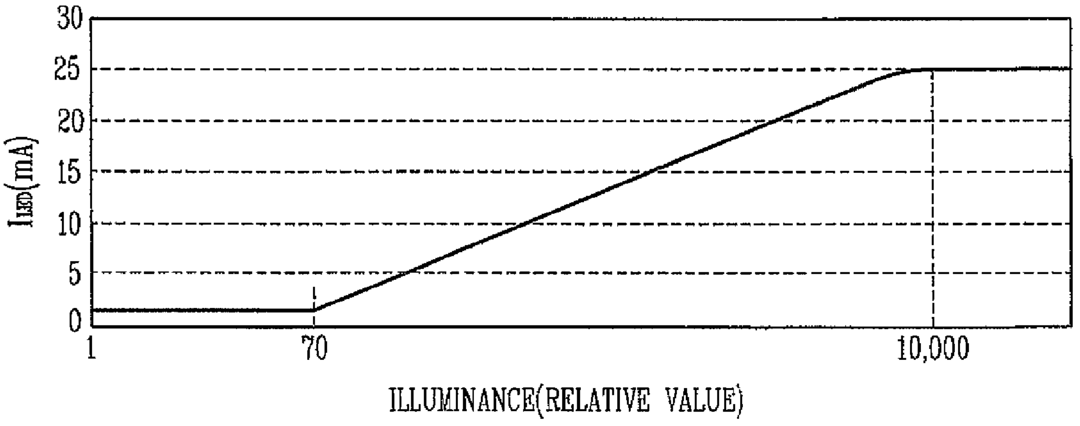
FIG. 8 is a graph showing a method for controlling current of illumination of the backlight according to combination of illuminance values set in the first and second registers in FIG. 6.

Accordingly, by adjusting the illuminance values set in the first and second registers 431 and 432, as shown in FIG. 8, the illuminance value for maintaining the maximum brightness as well as the illuminance value for maintaining the minimum brightness of illumination of the backlight can be adjusted.

A limiter 440 as shown in FIG. 5 serves to control the level of voltage outputted from the current regulating unit 430. The reason of controlling the voltage level is because when the voltage inputted to a backlight driving unit 600 is maximized, the current flowing through the backlight is maximized Namely, when the maximum current is inputted to the backlight, current consumption would increase, and if worse, the backlight may be damaged.

Assuming that a maximum voltage level that may be inputted to the backlight is 1.15 V, if the voltage outputted from the current regulating unit 430 is more than 1.15 V, the maximum current would flow to the backlight. Thus, the output voltage should be limited so as not to be more than the maximum voltage level.

The limiter 440 serves to limit the output voltage such that it may not exceed a voltage level set in a third register 441. The operation characteristics of the limiter 440 according to the third register 441 will now be described with reference to the graph as shown in FIG. 8.

Figure 9:
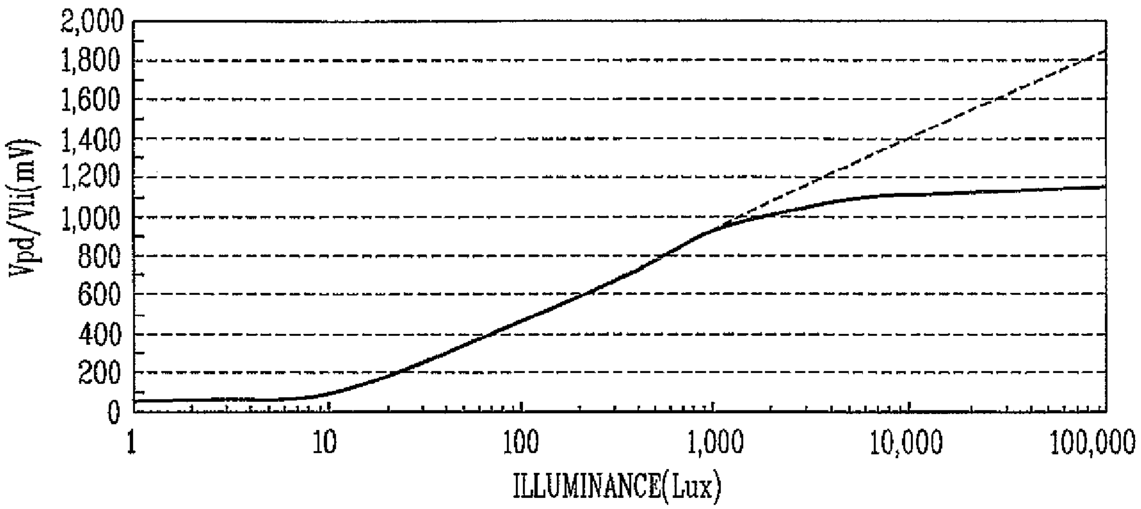
FIG. 9 is a graph showing operation characteristics of a limiter according to a voltage level set in a third register in FIG. 5.

With reference to FIG. 9, it is noted that when the voltage level set in the third register 441 is 1.15 V (equivalent to 1,150 mV), the limiter 440 limits output of the voltage. With reference to FIG. 8, it is noted that when voltage outputted at about 10,000 lux is maximized as 1.15V, a maximum current is inputted to the backlight to maintain illumination of the backlight with the maximum brightness.

The setting of the illuminance for maintaining the backlight with minimum brightness and the illuminance for maintaining the backlight with maximum brightness is effective, provided illuminance does not change suddenly.

However, in actual use, the illuminance of the surrounding environment may change suddenly.

For example, when the user enters a dark tunnel or a subway (underpass) from a bright environment or when the user goes out to a dark outdoor environment from a bright indoor environment at night, the surrounding illuminance will change suddenly from a positive value to a negative value. Conversely, when the user exits a dark tunnel or when the user goes out of his house to a bright playground or street, the surrounding illuminance will change suddenly from a negative value to a positive value.

If the illumination of the backlight changes from minimum brightness to maximum brightness according to a sharp change in the illuminance as described above, or conversely, if illumination of the backlight changes from maximum brightness to minimum brightness, the user may erroneously think that backlight of his mobile phone is broken. Or, when the ambient illuminance temporarily changes, such as when the mobile phone camera flash goes off during picture taking, illumination of the backlight may be over-sensitively reacted thereto and controlled in an unnecessary manner. Thus, the backlight needs to be more appropriately controlled such that its brightness changes naturally even if the ambient illuminance changes suddenly. Also, the reaction of the backlight to the temporary change in ambient illuminance should be controlled such that backlight illuminance changes are minimized.

With reference to FIG. 5, a delay unit 450 may serve to control such that brightness of illumination of the backlight can change more gradually during a particular delay time in spite of the sharp change in illuminance. Namely, the delay unit 450 may control the amount of current to make the brightness of illumination of the backlight change in a gradual manner within the delay time.

For example, if such delay time is not set, when ambient illuminance changes from minimum illuminance to maximum illuminance, brightness of illumination of the backlight would rapidly change from minimum brightness to maximum brightness. If, however, the delay time is set (for example, as 10 seconds), brightness of the illumination can change in a gradual manner during ten seconds. In the reverse case, with the delay time set, brightness of illumination of the backlight can change in a gradual manner to minimum brightness during ten seconds.

The delay unit 450 may include a fourth register (REG4) 451 or other component that sets a delay time to prevent brightness of illumination of the backlight from changing suddenly when ambient illuminance changes from a negative value to a positive value, and a fifth register (REG5) 452 or other component that sets a delay time to prevent brightness of illumination of the backlight from changing suddenly when the ambient illuminance changes from the positive value to the negative value. Here, the positive value and the negative value refer to a relative height of illuminance. For example, when illuminance changes from 10 lux to 20 lux, it may mean that the illuminance changes from a negative value to a positive value, and conversely, when illuminance changes from 20 lux to 10 lux, it may mean that the illuminance changes from a positive value to a negative value.

In addition to the delay time for changing brightness of illumination of the backlight, a variation of illuminance to which the delay time should be applied may be set.

For example, it is assumed that an illuminance variation between a minimum illuminance value and a maximum illuminance value is 100% and a variation of illuminance to which the delay time should be applied is 10%. If a current illuminance value has changed by smaller than 10% compared with a previous illuminance value, brightness of illumination of the backlight is adjusted without a time delay, and only when the current illuminance value has changed by larger than 10% compared with the previous illuminance value, the delay time is applied to make brightness of the illumination of the backlight change in a gradual manner.

Figure 10:
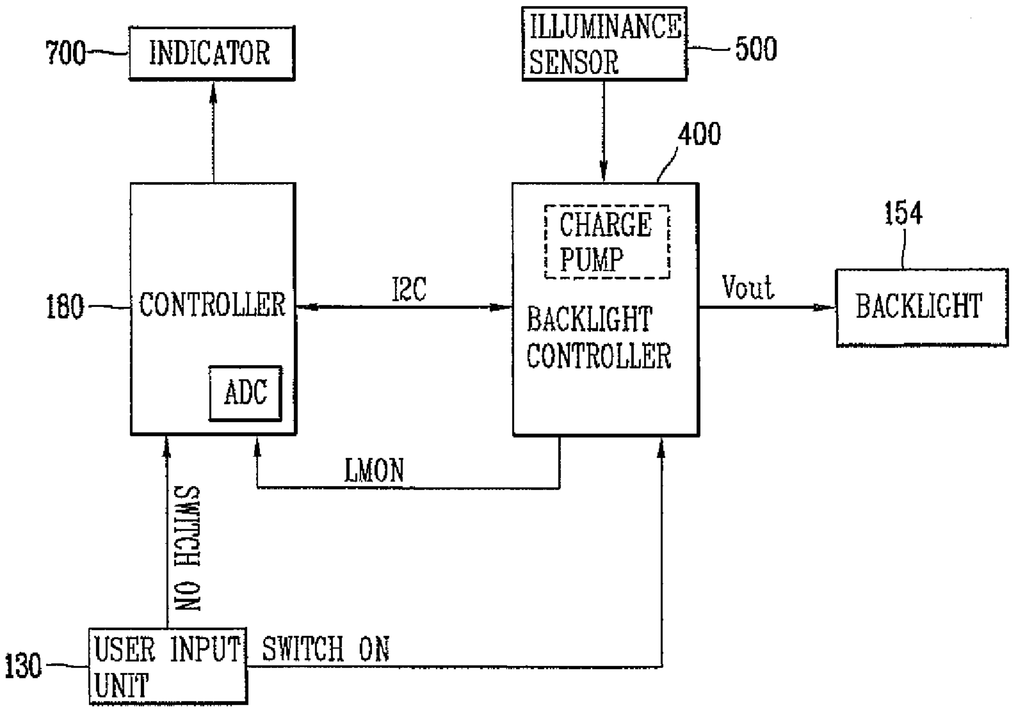
FIG. 10 is a schematic block diagram showing the configuration of the mobile terminal including the apparatus for controlling illumination of the backlight related to the present invention.

FIG. 10 is a schematic block diagram showing the configuration of the mobile terminal including the apparatus for controlling illumination of the backlight related to the present invention.

With reference to FIG. 10, when the user presses a power key (not shown) of the user input unit 130 to supply power to boot the mobile terminal 100, power is supplied to the controller 180 and a backlight controller 400. As mentioned above, the backlight controller 400 is separately configured, namely, not as a part of the controller 180, brightness of illumination of the backlight can be controlled while the mobile terminal 100 is being booted.

The controller 180 may monitor whether or not the backlight controller 400 operates normally. Namely, the controller 180 may monitor whether or not luminance control operation is normally performed according to illuminance upon receiving voltage outputted from the current regulating unit 430 via a particular terminal (port) LMON. The voltage outputted via the particular terminal LMON may be received and processed by an ADC (Analog Digital Converter) of the controller 180.

The set values in the registers included in each element of the backlight controller 400 may be changed according to communication with the controller 180. The controller 180 and the backlight controller 400 may communicate via a particular communication bus I2C (Inter Integrated Circuit). For this purpose, the backlight controller 400 may include a I2C communication port (not shown). Namely, values set in each register of the backlight controller 400 may well be changed even after manufacturing of the mobile terminal is completed as well as in the course of manufacturing. For example, the set values of the particular registers can be changed through communication when the mobile terminal is being booted or operated.

In other words, when a user interface is configured to change the set values of the registers, power consumption or illumination of the backlight can be controlled in various ways as desired by the user.

In addition, the controller 180 may inform the user through such monitoring that the backlight controller 400 normally operates. For example, an indicator 700 may be configured at the body of the mobile terminal 100 and controlled according to a change in the luminance of a backlight 154. Or, an operation state may be displayed by using an icon or the like on a particular region (e.g., an indicator display part) of the display unit 151 of the output unit 150. As an element of the output unit 150, the backlight 154 may include a plurality of LEDs.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:

a display unit having a backlight;

a power supply configured to output a drive current to the backlight;

an illuminance sensor configured to detect an ambient illuminance and to output a corresponding sensor current;

a backlight controller operatively connected to the illuminance sensor and configured to control a brightness of illumination of the backlight by regulating the drive current according to a change in the ambient illuminance detected by the illuminance sensor;

a controller operatively connected to the backlight controller and to the illuminance sensor and configured to monitor an operation state of the backlight controller and to change a set value of a register by cooperating with the backlight controller;

a limiter configured to limit a regulating voltage to not exceed a predetermined voltage level; and a delay unit configured to limit the drive current to allow the brightness of illuminance of the backlight to change in a gradual manner during a predetermined delay time when the ambient illuminance suddenly changes if the amount of ambient illumination change exceeds a predetermined value, and otherwise to allow the brightness of illumination of the backlight to change abruptly.

2. The mobile terminal of claim 1, wherein the controller is configured to control the backlight controller such that an operation state of the backlight controller is displayed on a predetermined display region of the display unit or is displayed through an indicator arranged on a body of the mobile terminal.

3. The mobile terminal of claim 1, wherein the register is configured to hold a minimum illuminance value for maintaining a minimum brightness of illumination of the backlight and a maximum illuminance value for maintaining a maximum brightness of illumination of the backlight.

4. The mobile terminal of claim 3, wherein both the minimum illuminance value and the maximum illuminance value differ and are variable values.

5. The mobile terminal of claim 1, wherein the register is configured to set a delay time to allow the brightness of illumination of the backlight to change in a gradual manner within a predetermined delay time when an ambient illuminance value suddenly changes.

6. The mobile terminal of claim 1, wherein the register is configured to hold a level of an output voltage for limiting an increase in the drive current when the backlight is maintained at a maximum brightness.

7. The mobile terminal of claim 1, wherein the backlight controller comprises:

a current/voltage converting unit configured to convert the sensor current into a sensor voltage;

a temperature compensating unit configured to receive the sensor voltage and to output a temperature compensated voltage; and a current regulating unit configured to receive the temperature compensated voltage and to output a regulating voltage used to regulate the drive current according to the change in the ambient illuminance.

8. The mobile terminal of claim 7, wherein the controller is configured to monitor the regulating voltage and comprises an analog-to-digital converter (ADC) that is configured to convert the regulating voltage into a digital value.

9. The mobile terminal of claim 1, wherein the controller is configured to change a set value of the register while the mobile terminal is being booted or operated.

10. The mobile terminal of claim 1, wherein the backlight controller is configured to control the illumination of the backlight by a value previously set in the register even when the mobile terminal is being booted.

11. The mobile terminal of claim 1, wherein the backlight controller further comprises:

a predetermined communication port configured to communicate with the controller.

12. A method of using an apparatus for controlling illumination of a backlight, wherein the apparatus comprises a display having the backlight; a power supply configured to supply a drive current to the backlight; a current regulating unit configured to receive an input control voltage and to output a regulated control voltage configured to control the drive current according to a change in an ambient illuminance; a limiter configured to limit the regulated control voltage to not exceed a pre-set level; and a delay unit configured to control the drive current to allow brightness of illumination of the backlight to change, the method comprising:

operating the delay unit in a gradual manner during a predetermined delay time when the ambient illuminance changes rapidly if the amount of ambient illuminance change exceeds a predetermined value, and otherwise allowing the brightness of illumination of the backlight to change abruptly.

13. A method of operating a mobile terminal which comprises a display unit having a backlight; a power supply configured to output a drive current to the backlight; an illuminance sensor configured to detect an ambient illuminance and to output a corresponding sensor current; a backlight controller operatively connected to the illuminance sensor and configured to control a brightness of illumination of the backlight by regulating the drive current according to a change in the ambient illuminance detected by the illuminance sensor; a controller operatively connected to the backlight controller and to the illuminance sensor and configured to monitor an operation state of the backlight controller and to change a set value of a register by cooperating with the backlight controller; a limiter configured to limit the regulating voltage to not exceed a predetermined voltage level; and a delay unit configured to limit the drive current to allow brightness of illumination of the backlight to change, the method comprising:

operating the delay unit in a gradual manner during a predetermined delay time when the ambient illuminance suddenly changes if the amount of ambient illuminance change exceeds a predetermined value, and otherwise allowing the brightness of illumination of the backlight to change abruptly.

14. An apparatus for controlling illumination of a backlight, comprising:

a display having a backlight;

a power supply configured to supply a drive current to the backlight;

a current regulating unit configured to receive an input control voltage and to output a regulated control voltage configured to control the drive current according to a change in an ambient illuminance;

a limiter configured to limit the regulated control voltage to not exceed a pre-set level; and a delay unit configured to control the drive current to allow brightness of an illumination of the backlight to change in a gradual manner during a predetermined delay time when the ambient illuminance changes rapidly if the amount of ambient illuminance change exceeds a predetermined value, and otherwise to allow the brightness of illumination of the backlight to change abruptly.

15. The apparatus of claim 14, further comprising:

an illuminance sensor configured to detect the ambient illuminance and to output a corresponding sensor current;

a current/voltage converting unit configured to convert the sensor current into a sensor voltage; and a temperature compensating unit configured to receive the sensor voltage and to output a temperature compensated voltage to the current regulating unit as the input control voltage.

16. The apparatus of claim 14, wherein the current regulating unit comprises:

a first register configured to set a minimum illuminance value for the backlight; and a second register configured to set a maximum illuminance value for the backlight.

17. The apparatus of claim 16, wherein the current regulating unit is configured to regulate the drive current according to a proportional expression relative to the ambient illuminance.

18. The apparatus of claim 14, wherein the limiter comprises a register configured to set a voltage level to be limited.

19. The apparatus of claim 14, wherein the backlight controller is included in a charge pump or is a separate luminance control chip.

* * * * *